US010354671B1

(12) United States Patent
Kaewtip et al.

(10) Patent No.: US 10,354,671 B1
(45) Date of Patent: Jul. 16, 2019

(54) SYSTEM AND METHOD FOR THE ANALYSIS AND SYNTHESIS OF PERIODIC AND NON-PERIODIC COMPONENTS OF SPEECH SIGNALS

(71) Applicants: Kantapon Kaewtip, Psadena, CA (US); Fernando Villavicencio, South Pasadena, CA (US); Mark Harvilla, Pasadena, CA (US)

(72) Inventors: Kantapon Kaewtip, Psadena, CA (US); Fernando Villavicencio, South Pasadena, CA (US); Mark Harvilla, Pasadena, CA (US)

(73) Assignee: OBEN, INC., Pasadena, CA (US)

( * ) Notice: Subject to any disclaimer, the term of this patent is extended or adjusted under 35 U.S.C. 154(b) by 19 days.

(21) Appl. No.: 15/901,864

(22) Filed: Feb. 21, 2018

Related U.S. Application Data

(60) Provisional application No. 62/461,721, filed on Feb. 21, 2017.

(51) Int. Cl.

| | |
|---|---|
| *G10L 21/02* | (2013.01) |
| *G10L 15/18* | (2013.01) |
| *G10L 15/22* | (2006.01) |
| *G10L 19/00* | (2013.01) |
| *G10L 21/038* | (2013.01) |

(Continued)

(52) U.S. Cl.
CPC ...... *G10L 21/0202* (2013.01); *G10L 15/1822* (2013.01); *G10L 15/22* (2013.01); *G10L 19/00* (2013.01); *G10L 21/038* (2013.01); *G10L 25/24* (2013.01); *G10L 25/90* (2013.01)

(58) Field of Classification Search
None
See application file for complete search history.

(56) References Cited

U.S. PATENT DOCUMENTS

| | | | |
|---|---|---|---|
| 5,774,849 A * | 6/1998 | Benyassine | ............... G01L 3/00 |
| | | | 704/214 |
| 6,535,847 B1 * | 3/2003 | Marston | ............... G10L 19/097 |
| | | | 704/208 |

(Continued)

*Primary Examiner* — Marcus T Riley
(74) *Attorney, Agent, or Firm* — Andrew Naglestad

(57) ABSTRACT

A voice coder configured to resolve periodic and aperiodic components of spectra is disclosed. The method of voice coding includes parsing the speech signal into a plurality of speech frames; for each of the plurality of speech frames: (a) generating the spectra for the speech frame, (b) parsing the spectra of the speech frame into a plurality of sub-bands, (c) transforming each of the plurality of sub-bands into a time-domain envelope signal, and (d) generating a plurality of sub-band voicing factors, wherein each sub-band voicing factor indicates the harmonicity of one of the plurality of sub-bands, and each sub-band voicing factor is based on the periodicity of one of said time-domain envelope signals associated with one of the plurality of sub-bands. The voice coder may regenerate the speech signal by generating a plurality of recomposed frames, each recomposed frame being based on: (a) the spectra for one of said plurality of speech frames, and (b) the sub-band voicing factors associated with the plurality of sub-bands for one of said plurality of speech frames; and then generating a recomposed speech signal from the plurality of recomposed frames.

12 Claims, 6 Drawing Sheets

(51) Int. Cl.
*G10L 25/24* (2013.01)
*G10L 25/90* (2013.01)

(56) References Cited

U.S. PATENT DOCUMENTS

| | | | | |
|---|---|---|---|---|
| 7,974,714 | B2 * | 7/2011 | Hoffberg | G06K 9/00369 |
| | | | | 360/75 |
| 10,008,193 | B1 * | 6/2018 | Harvilla | G10H 1/20 |
| 10,057,736 | B2 * | 8/2018 | Gruber | H04W 4/16 |
| 10,192,552 | B2 * | 1/2019 | Raitio | G10L 13/033 |

\* cited by examiner

SYSTEM AND METHOD FOR THE ANALYSIS AND SYNTHESIS OF PERIODIC AND NON-PERIODIC COMPONENTS OF SPEECH SIGNALS

CROSS-REFERENCE TO RELATED APPLICATION(S)

This application claims the benefit of U.S. Provisional Patent Application Ser. No. 62/461,721 filed Feb. 21, 2017, titled "System and method for the analysis and synthesis of periodic and non-periodic components of speech signals based on a harmonic plus noise model (HNM) and sub-band periodicity measures," which is hereby incorporated by reference herein for all purposes.

TECHNICAL FIELD

The invention relates to the field of speech synthesis with application to technologies regarding voice transformation and text-to-speech synthesis (TTS) tasks.

BACKGROUND

The techniques and methodology for the analysis (decomposition), modification, and synthesis (recomposition) of speech signals are generally represented as a single processing unit called "vocoder". A vocoder is able to accomplish this processing efficiently and seeks to generate natural sounding speech, which is a fundamental element of technology involving the generation of vocal sounds (speech synthesis). Speech signals (e.g., waveforms) are processed in a short-term basis, typically in the range of ~[20, 40] milliseconds, assuming that their main statistical properties remain unchanged, i.e, stationarity, within this temporal constraint. Most of the vocoding techniques do an initial classification of each frame based on whether the frame is either (a) "voiced" which is primarily the result of periodic action of the vocal chords or (b) "unvoiced" which is primarily due to aspiration noise from the lungs, for example.

Although voiced frames are predominated by periodic sound, these frames may also include a component of noise or nonharmonic sound. In the next stage of processing, the periodic component of the voiced frames is separated from the unvoiced portion. A popular way to model both voiced and unvoiced contributions is done using a technique called Harmonic plus Noise Modeling (HNM). In the context of HNM, periodic (voiced) and aperiodic (unvoiced) contributions are typically represented as time-varying harmonic and modulated-noise components, respectively.

In accordance with HNM, the content of both voiced and unvoiced components are divided in the frequency domain by a time-varying parameter referred to as Maximum Voiced Frequency (MVF): the lower band below this value is fully modeled by harmonic content (voiced) whereas the upper band, above the MVF, by noise alone as shown in FIG. 1.

To generate or otherwise synthesize speech waveforms, the combined contribution of the bands above and below the MVF are obtained by applying a high pass filter to modulated white-noise and a low pass filter to a fully harmonic component. The cut-off frequency of the two filters is set according to the MVF.

A vocoder based on a HNM signal recomposition may sometimes produce natural-sounding speech after transformation and/or re-synthesis if both voiced and noise bands are properly identified and processed. The estimation of the corresponding MVF, however, can be very challenging for numerous reasons including the following: (a) in context of the frequency-domain representation of speech frame, local maxima associated with harmonic components sometimes appear to be distributed non-uniformly across frequencies and those maxima separated by bands of noise or other unvoiced elements, as shown in FIG. 2, and (b) some periodic components of the waveform may be found on "unvoiced" frames where the transitions from predominantly voiced to predominantly unvoiced frames is smooth, which may result in degradation when regenerating the waveform. There is therefore a need for a technique to account for noise components non-uniformly distributed in "voiced" frames as well as periodic components in "unvoiced" frames.

SUMMARY

1. The invention in the preferred embodiment features a system and method for producing and filtering speech with a voice coder. The voice coder may comprises: a microphone for recording a speech signal from a user; a frame generator configured to parse the speech signal into a plurality of speech frames; a pitch detector configured to determine a pitch of each of the plurality of speech frames; a Fourier Transform module for generating a spectra or MCEP coefficients for each of the plurality of speech frames; a sub-band generator configured to parse the spectra of each speech frame into a plurality of sub-bands; a Hilbert Transform module configured to transform each of the plurality of sub-bands into a time-domain envelope signal; a similarity module configured to generate a plurality of sub-band voicing factors, wherein each sub-band voicing factor indicates the periodicity of one of the plurality of sub-bands, and each sub-band voicing factor is based on one of said time-domain envelope signals associated with one of the plurality of sub-bands; a frame synthesizer configured to generate a plurality of recomposed frames, each recomposed frame being based on: (a) the spectra for one of said plurality of speech frames, and (b) the sub-band voicing factors associated with the plurality of sub-bands for one of said plurality of speech frames; and a waveform generator configured to generate a recomposed speech signal from the plurality of recomposed frames. Each of said sub-band voicing factors is based on a measure of the periodicity in the time-domain envelope signal. Periodicity, in turn, is determined based on a correlation between the time-domain envelope signal and a time-shifted representation of the same time-domain envelope signal. The amount of the time-shift is equal to the fundamental period of the associated speech frame, which is derived from the pitch of the frame.

The method of voice coding comprises: recording a speech signal from a user with a microphone; parsing the speech signal into a plurality of speech frames; determining a pitch of each of the plurality of speech frames; for each of the plurality of speech frames: (a) generating a spectra for the speech frame, (b) parsing the spectra of the speech frame into a plurality of sub-bands, (c) transforming each of the plurality of sub-bands into a time-domain envelope signal, and (d) generating a plurality of sub-band voicing factors, wherein each sub-band voicing factor indicates the periodicity of one of the plurality of sub-bands, and each sub-band voicing factor is based on one of said time-domain envelope signals associated with one of the plurality of sub-bands; generating a plurality of recomposed frames, each recomposed frame being based on: (a) the spectra for one of said plurality of speech frames, and (b) the sub-band voicing factors associated with the plurality of sub-bands for one of said plurality of speech frames: and generating a recomposed speech signal from the plurality of recomposed frames.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
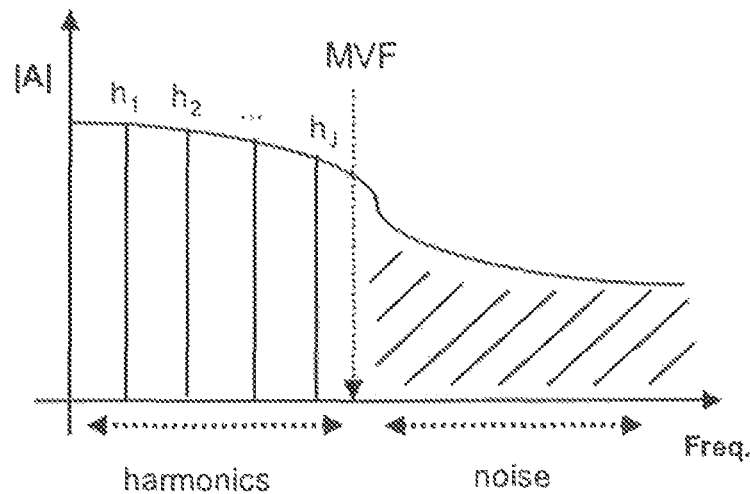
FIG. 1 is a frequency-domain representation showing a Maximum Voiced Frequency (MVF) cutoff.
Figure 2:
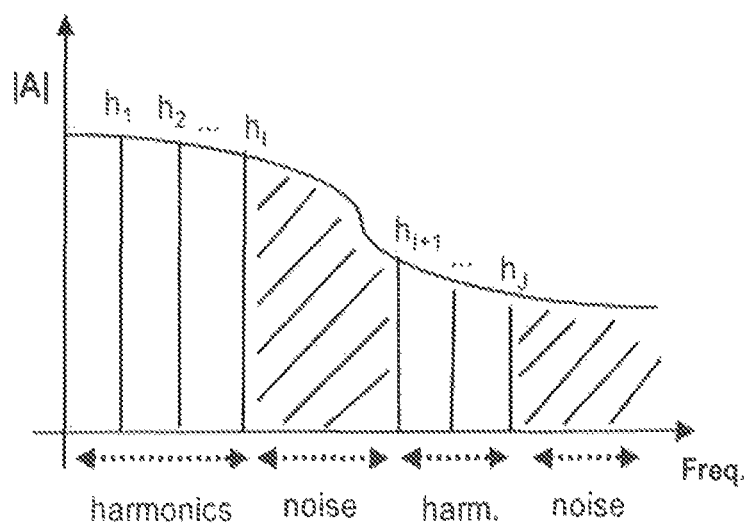
FIG. 2 is a frequency-domain representation of a frame showing alternating bands of periodic and a periodic components across the frequency spectrum.

The present invention provides includes a "voice coder" or "vocoder" configured to decompose, modify, recompose (synthesize) speech signals. The speech signals are processed using the decomposition and recomposition techniques in the present invention which then provide more realistic-sounding voice reconstructions than prior art techniques. The present invention achieves this improvement by: (a) discarding the voiced/unvoiced characterization for speech frames, (b) applying full HNM to all frames to allow a smooth combination and progression of periodic/non-periodic components along the waveform, and (c) determining a degree of voiciness (or rate of harmonicity) per frequency component based on a sub-band decomposition of the spectrum. For example, the spectrum corresponding to a frame of speech data may include multiple sub-bands of voiced and unvoiced data. These sub-bands within a frame are identified, processed differently depending on whether the sub-band is periodic or aperiodic, and then reconstructed accordingly. A spectrum including multiple voiced and unvoiced frequency bands is shown in FIG. 2.

Figure 3:
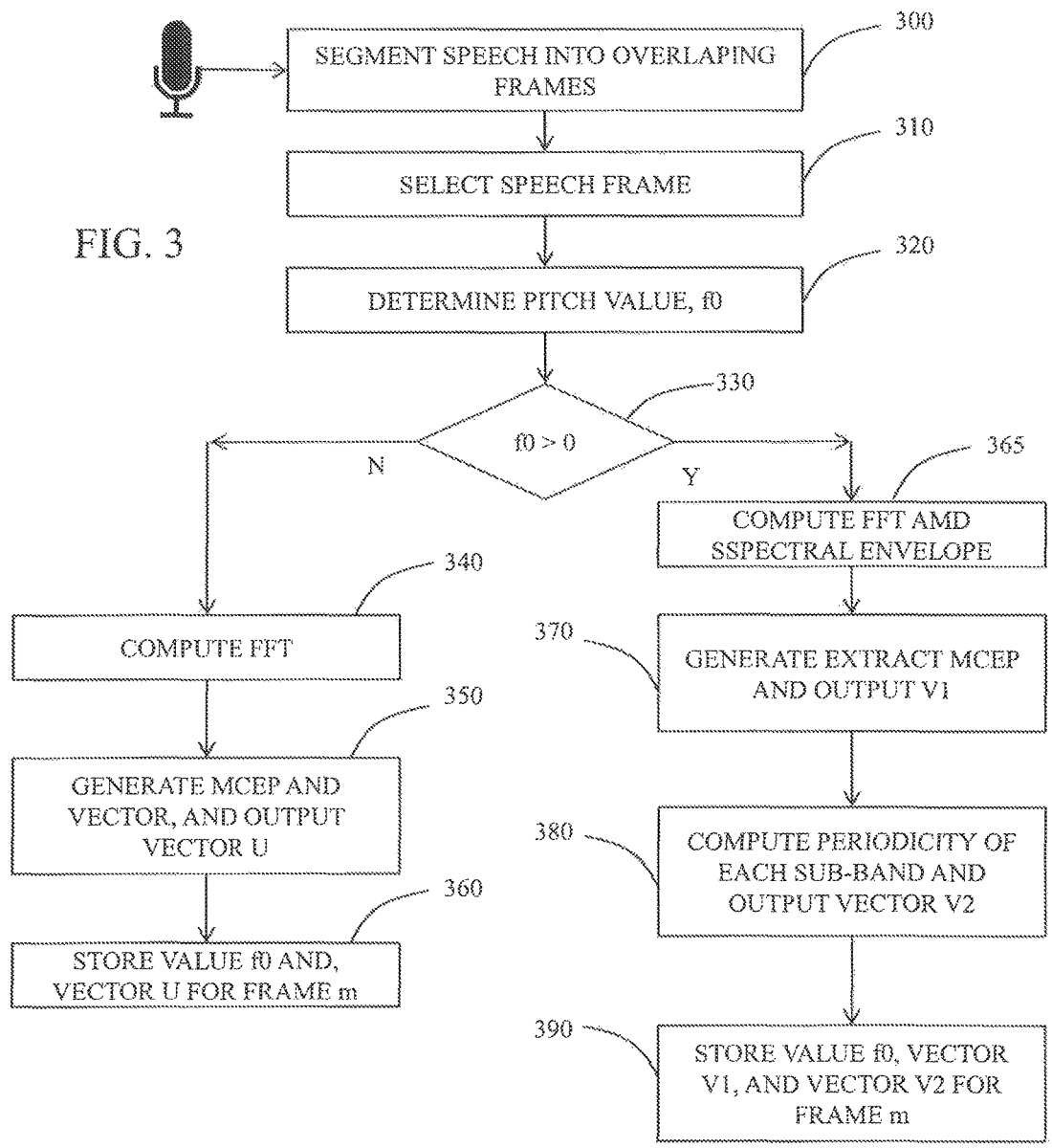
FIG. 3 is a flowchart of the process for decomposing speech data, in accordance with one embodiment of the present invention.

Illustrated in FIG. 3 is a flowchart of the process for decomposing speech data, in accordance with a preferred embodiment of the invention. First, the speech of a user is received from a microphone and the speech signal recorded to a database. The speech signal is then parsed or otherwise segmented 300 into overlapping frames for short-time analysis. Each frame represents an analysis window and is on the order of five to thirty milliseconds in duration. Sequential frames are acquired in 5 millisecond intervals, which results in frames that overlap in time.

The present invention is configured to select 310 each speech frame and process individually. When the processing of a frame is completed, the vocoder of the present invention selects another frame for processing until the entire speech signal is decomposed. The current frame is designated by the index m.

The vocoder determines 320 the pitch value f0 for the current frame m. Any of a number of pitch tracking algorithms may be used to determine the pitch.

In one embodiment, each and every frame is processing using the sub-band analysis described below. In an alternative embodiment, only "voiced" frames are processed in this manner. This alternative embodiment is shown in blocks 330, 340, 350, and 360. In decision block 330, the vocoder classifies the speech frame as either "voiced" or "unvoiced" based on the value of the pitch f0. If the pitch is equal to zero, the frame is determined to be "unvoiced", i.e., determined to be devoid of any user voice data. If the pitch is greater than zero, the frame is determined to be "voiced", i.e., contain full or partial user voice data.

If the pitch i) is zero, decision block 330 is answered in the negative and the vocoder generates 340 the Fourier Transform (FFT) of the unvoiced frame and extracts 350 audio features with which to characterize the spectra. In the preferred embodiment, the audio features include Mel-Frequency Cepstral Coefficients (MCEP) which are represented by the feature vector U. The vector U, together with fundamental pitch f0, are stored 360 for later use during the waveform synthesis (reconstruction) described in more detail below.

If the pitch ft is a positive number, decision block 330 is answered in the affirmative and the vocoder computes a Fourier Transform of the frame to produce 365 a spectral representation of the speech frame m. Audio features, preferably MCEP's feature, that characterize the speech data for the frame are then extracted 370 from the spectra. A feature vector comprising the MCEP features represented by vector V1 is outputted and stored in a database for waveform synthesis.

The voiced speech frame generally includes "voiced" components and may further include "unvoiced" components, as well. The vocoder estimates the periodicity multiple portions of the spectral envelop in order to distinguish alternating bands of voiced components from unvoiced components. In particular, the vocoder computes a plurality of sub-bands and estimates 380 the degree of periodicity for each of the plurality of frequency sub-bands. Periodicity is determined in accordance with the flowchart shown in FIG. 4 discussed in more detail below. The periodicity of the plurality of sub-bands of a frame is represented by the vector V2.

The vocoder then stores 390 the vector V1, vector V2, together with f0 for later use during the waveform synthesis procedure described in more detail below. The processing described above for FIG. 3 is repeated for each frame m until the entire speech signal s is processed.

Figure 4:
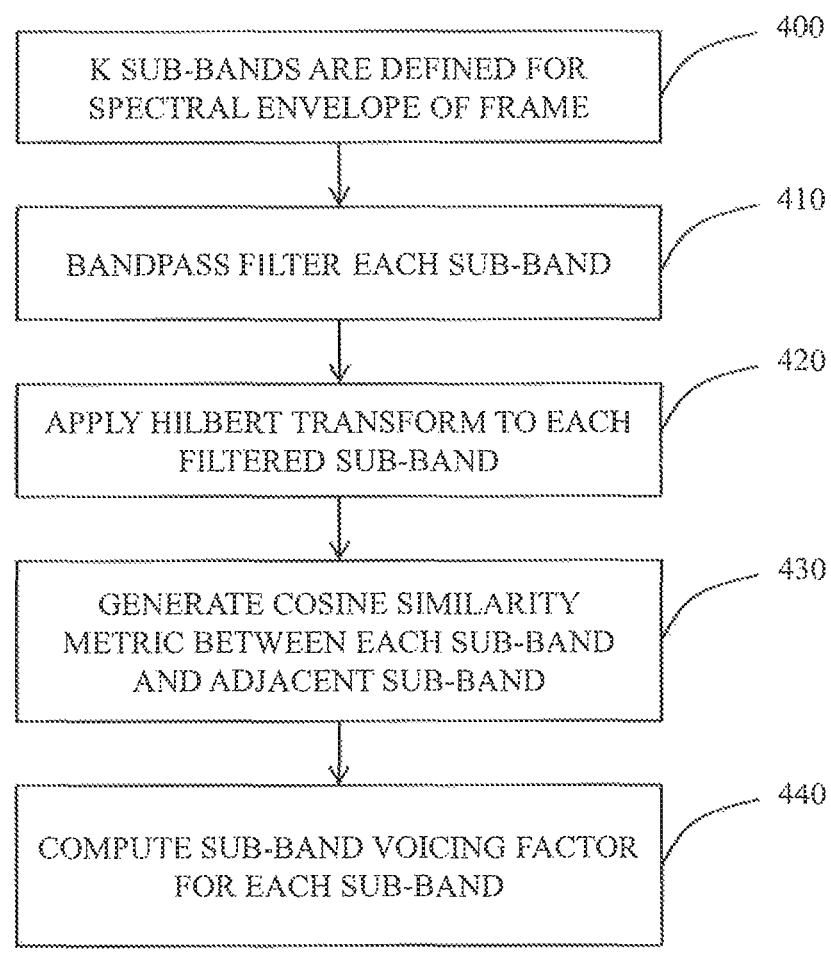
FIG. 4 is a flowchart of the process for estimating periodicity, in accordance with one embodiment of the present invention.

Illustrated in FIG. 4 is a flowchart of the method of determining periodicity of the sub-bands of a frame. First, the plurality of sub-bands, K, are defined 400 based on their upper and lower cutoff frequencies. The same sub-bands are generally the same for the analysis of each of the frames of the speech signal. The lower cutoff frequency is given by $f_L$ and the upper cutoff frequency given by $f_R$. In the preferred embodiment, the K sub-bands range from zero Hertz the last integer kiloHertz value in the spectrum, $f_{sKH}$, given the sampling rate, $f_s$, of the signal. For example, the $f_{sKH}$=22 kHz for fs=44.1 kHz.

In the current implementation, the set of lower cutoff frequencies for the plurality of sub-bands of a frame are given by $f_{kL}$ where:

$f_{kL}$=[0, 500, 1000, . . . 9500, 10000, 11000, . . . $f_{sKH}$−1000]; for k=1, . . . K.

Similarly, the set of upper cutoff frequencies are for the plurality of sub-bands is given by $f_{kR}$ where:

$f_{kR}$=[1000, 1500, 2000, . . . 10500, 11000, 12000, . . . $f_{sKH}$]; for k=1, . . . K.

Next, each of the plurality of sub-bands, $f_{kL}$ to $f_{kR}$, for for k=1, . . . K is bandpass filtered 410 to generate a plurality of signal components designated $s_1[n]$, $s_2[n]$, . . . , $s_K[n]$. A Hilbert transform is then applied 420 to each of the filtered sub-bands $s_1[n]$, $s_2[n]$ . . . , $s_K[n]$ to obtain envelope signals given by $s'_1[n]$, $s'_2[n]$ . . . , $s'_K[n]$. Each of the envelope signals $s'_1[n]$, $s'_2[n]$ . . . , $s'_K[n]$ represents a time-domain representation of the spectra of a different sub-band. Each of the envelope signals may be the temporal length of the frame itself.

To determine the degree of harmonicity at the sub-band the vocoder determines how much the related periodicity repeat in time for a time-domain representation of the frequency components of the sub-band. If harmonic components dominate the sub-band, a periodicity will be observed in the time-domain representation of the Hilbert transform of the sub-band. If non-harmonic components dominate the sub-band, the main features of the Hilbert transform of the sub-band will generally not be found to repeat in its time-domain representation. The vocoder of the present invention measures the degree of periodicity using a cosine similarity measure. In particular, the time-domain envelops signal of a sub-band, referred to herein as seg1, is correlated with a time-shifter version of same time-domain envelope signal, referred to herein as seg2. Both seg1 and seg2 are derived from the same portion of the speech signal. However, seg1 and seg2 are offset in time by the fundamental period of the frame. The fundamental period is derived from the pitch f0 of the frame. The implementation of this correlation is discussed immediately below. As one skilled in the art will appreciate, a one periodic component in seg1 will align with a different periodic component in seg2 and yield a positive correlation therebetween. Computation of this cosine similarity measure is discussed immediately below.

For each component of the envelope signal, $s'_k[n]$, the vocoder computes 430 a cosine similarity between the two segments of the time-domain envelop signal generated via the Hilbert Transform. The first segment of $s'_k[n]$, namely seg1, is taken from samples $n_m$ to $n_m$+W of the speech signal while the second segment, namely seg2, is taken from samples $n_m$+T0 to $n_m$+T0+W of the speech signal, where $n_m$ is the first sample of frame m, W is the window length (in samples) and T0 corresponds to the fundamental pitch period in samples.

The cosine similarity, $x_k$, between seg1 and seg2 is then given by:

$$x_k = \frac{seg1_k \cdot seg2_k}{|seg1_k||seg2_k|}$$

A sub-band voicing factor is then estimated 440 for each component of the envelope signal, $s'_k[n]$, based on the associated cosine similarity. In the preferred embodiment, the sub-band voicing factor is given by $y_k$=max($2x_k$−1,rmin) where $r_{min}$, is a value between 0 and 1. The variable $r_{min}$ is predetermined for the vocoder in order to prevent a potential overestimation of the periodicity. In the preferred embodiment, $r_{min}$=0.5.

Thereafter, the vocoder generates and stores a vector of sub-band voicing factors, V2, comprising the values $y_1$, $y_2$, . . . , $y_K$.

Figure 5:
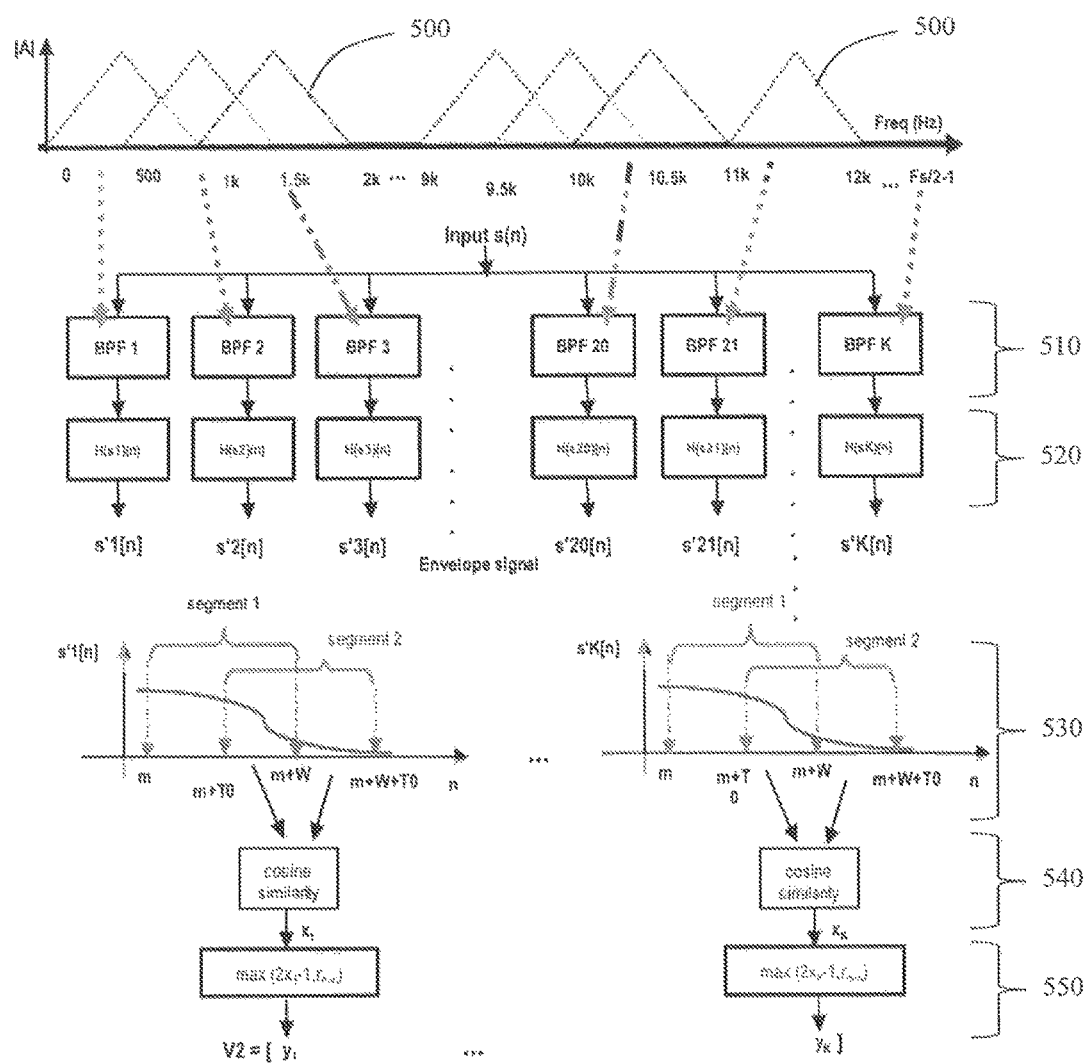
FIG. 5 is a diagrammatic illustration of the process for decomposing speech data, in accordance with one embodiment of the present invention.

Illustrated in FIG. 5 is a diagrammatic illustration of the process of decomposing a speech signal. First, K sub-bands 500 are generated from the spectral envelop of a frame of speech signal. Each of the sub-bands is one thousand kHz wide, and each sub-band overlaps with at least one other sub-band. Each of the sub-bands is then bandpass filtered 510 and a Hilbert transform applied 520 to that output. Application of the Hilbert transform to each of the filtered sub-bands results in a sequence of time-domain envelope signals given by $s'_1[n]$, $s'_2[n]$ . . . , $s'_K[n]$. For each time-domain envelope signals, a cosine similarity metric is generated 540 between the given segment of data and same segment of data with a temporal offset given by T0. Repeating peaks in a time-domain envelop signal result in relatively high cosine similarity measures. The larger of the cosine similarity metric and predetermined constant, $r_{min}$, is selected 550 and designated as the sub-band voicing factor. A vector V2, comprised of the sub-band voicing factors, is retained for re-composition or synthesized, as discussed below.

Figure 6:
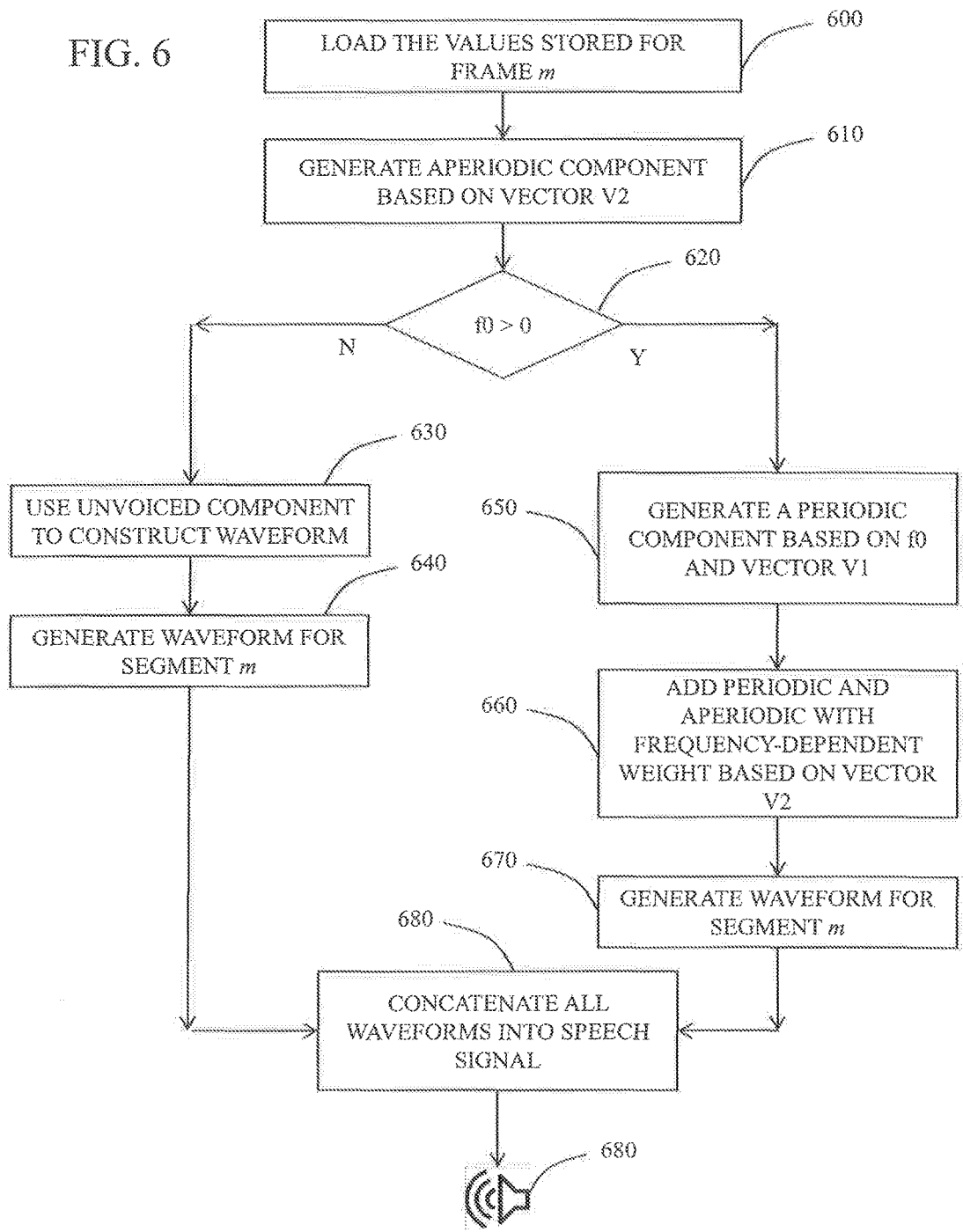
FIG. 6 is a flowchart of the process for synthesizing speech data, in accordance with one embodiment of the present invention.

Illustrated in FIG. 6 is a flowchart of the process of synthesizing speech data using the vocoder of the present invention. To start, for each frame m, the pitch ft), feature vector V1, periodicity vector V2 are loaded 600 from memory. The unvoiced contribution, consisting primarily of noise, is generated 610 with white-noise modulated by the spectral envelope information contained in vector V2. If the pitch value f0 is zero, the decision block 620 is answered in the negative and the vocoder constructs 630 the time-domain waveform segment for frame m from the frequency-domain information of the unvoiced component using an Inverse Fourier Transform, for example. The segment of waveform is outputted 640 and combined with the waveform segments of other frames to produce a synthetic voice for audio playback to a user via a speaker or mobile phone.

If the pitch value f0 is a positive number, however, decision block 620 is answered in the affirmative and a harmonic component is generated 650 based on the fundamental frequency f0 and the MCEP coefficients of the spectra according to the information contained in vector V1.

A voicing filter is defined and applied to the harmonic component, consisting primarily of voice data, using the interpolation of the components of vector V2, namely $y_1$, $y_2$, . . . $y_k$ located at the center of each sub-band according to $f_{kL}$ and $f_{kR}$ as gains.

Similarly, the modulated noise component is filtered using the interpolation of the values defined by the components of vector V2 in the form $1-y_1$, $1-y_2$, . . . , $1-y_k$ as gains. As specified for the harmonic component, the location of these gains in the frequency domain corresponds also to the center of each sub-band according to $f_{kL}$ and $f_{kR}$.

The filtered versions of harmonic component and noise component are then added 650 to construct the waveform segment for frame m. The segment of waveform is combined 660 with the waveform segments of other frames to produce 670 a synthetic voice for audio playback to a user via a speaker 680 or mobile phone.

Figure 7:
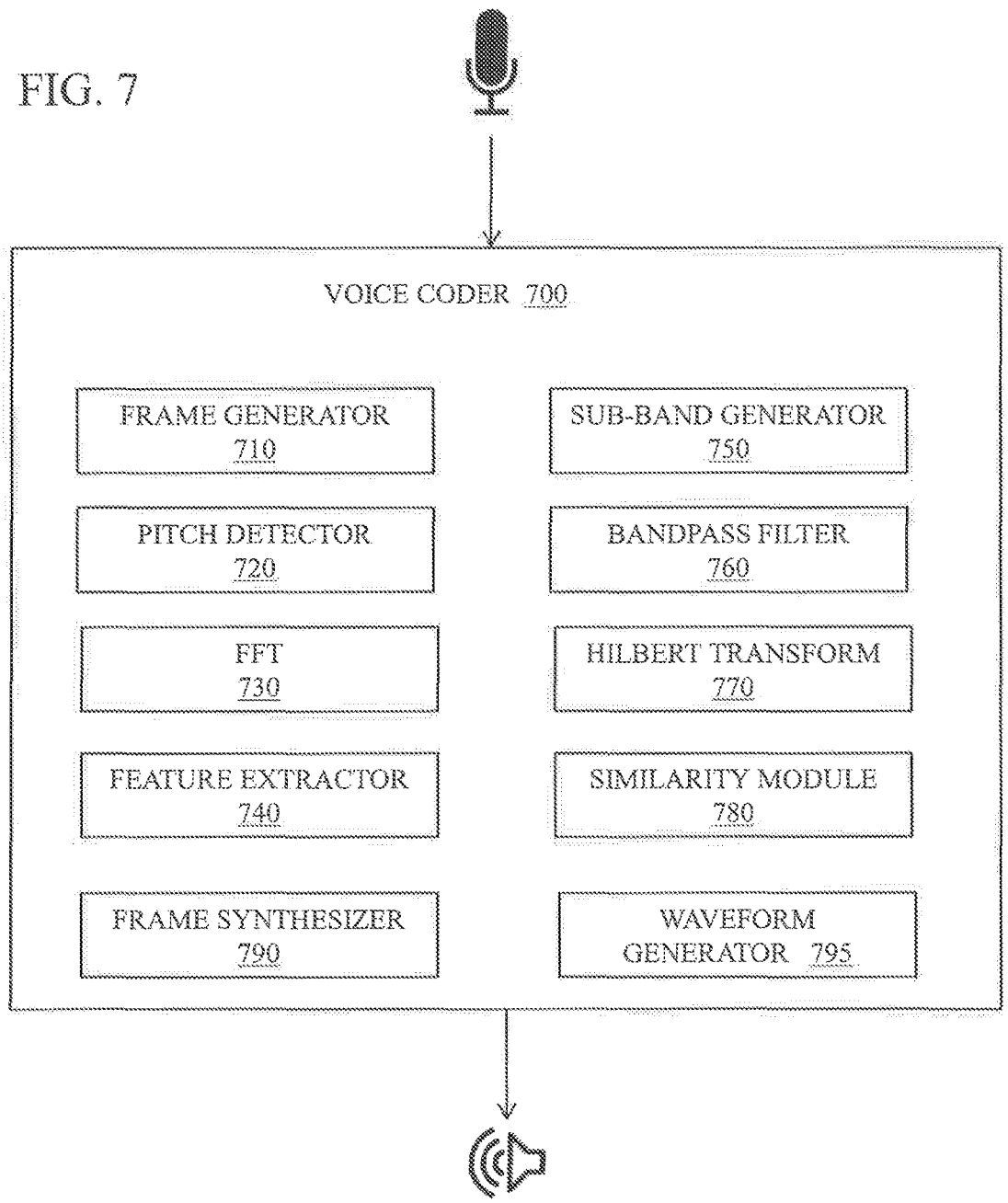
FIG. 7 is a functional block diagram of a voice coder, in accordance with one embodiment of the present invention.

Illustrated in FIG. 7 is a functional block diagram of the vocoder. The vocoder 700 includes a frame generator 710 configured to parse a speech signal into a plurality of speech frames, a pitch detector 720 to determine the fundamental pitch f0 of each frame, a Fourier Transform module FFT 730 configured to generate spectra for the frames, a feature extractor 740 configured to extract MCEP coefficients or other audio features with which to represent the spectra, a sub-band generator 750 configured to parse a frame into a plurality of sub-bands, a bandpass filter 760 configured to filter the plurality of sub-bands, a Hilbert Transform module 770 configured to transform the sub-bands into time-domain envelope signals, a similarity module 780 configured to generate a sub-band voicing factor indicating the periodicity of a sub-band, a frame synthesizer 790 configured to recompose a frame based on the a predetermined pitch, the periodic components of the spectra, and sub-band voicing factors, and waveform generator 795 configured to produce a speech signal from a plurality of recomposed frames.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A voice coder comprising:
   a microphone for recording a speech signal from a user;
   a frame generator configured to parse the speech signal into a plurality of speech frames;
   a pitch detector configured to determine a fundamental period of each of the plurality of speech frames;
   a Fourier Transform module configured to generate a spectra for each of the plurality of speech frames;
   a sub-band generator configured to parse the spectra of each speech frame into a plurality of sub-bands;
   a Hilbert Transform module configured to transform each of the plurality of sub-bands into a time-domain envelope signal;
   a similarity module configured to generate a plurality of sub-band voicing factors, wherein each sub-band voicing factor indicates a harmonicity of one of the plurality of sub-bands, and each sub-band voicing factor is based on a periodicity of said time-domain envelope signals associated with one of the plurality of sub-bands;
   a frame synthesizer configured to generate a plurality of recomposed frames, each recomposed frame being based on:
      a) the spectra for one of said plurality of speech frames, and
      b) the sub-band voicing factors associated with the plurality of sub-bands for one of said plurality of speech frames; and
   a waveform generator configured to generate a recomposed speech signal from the plurality of recomposed frames.

2. The voice coder of claim 1, wherein the Fourier Transform module is further configured to generate Mel Cepstral coefficients representing the spectra for each of the plurality of speech frames.

3. The voice coder of claim 1, wherein each of said sub-band voicing factors is based on a measure of the periodicity in the time-domain envelope signal.

4. The voice coder of claim 3, wherein said periodicity is based on a correlation between the time-domain envelope signal and a time-shifted representation of the said time-domain envelope signal.

5. The voice coder of claim 4, wherein said time-domain envelope signal is time-shifted by a time corresponding to the fundamental period of an associated speech frame.

6. A method of voice coding, the method comprising:
   recording a speech signal from a user with a microphone;
   parsing the speech signal into a plurality of speech frames;
   determining a fundamental period of each of the plurality of speech frames,
   generating a spectra for each of the plurality of speech frames;
   parsing the spectra of each speech frame into a plurality of sub-bands,
   transforming each of the plurality of sub-bands into a time-domain envelope signal;
   generating a plurality of sub-band voicing factors, wherein each sub-band voicing factor indicates a harmonicity of one of the plurality of sub-bands, and each sub-band voicing factor is based on a periodicity of said time-domain envelope signals associated with one of the plurality of sub-bands;
   generating a plurality of recomposed frames, each recomposed frame being based on:
      a) the spectra for one of said plurality of speech frames, and
      b) the sub-band voicing factors associated with the plurality of sub-bands for one of said plurality of speech frames, and
   generating a recomposed speech signal from the plurality of recomposed frames.

7. The method of claim 5, further comprising:
   transmitting the recomposed speech signal to a speaker for playback to a user.

8. The method of claim 5, further comprising:
generate Mel Cepstral coefficients representing the spectra for each of the plurality of speech frames.

9. The method of claim 5, wherein each of said sub-band voicing factors is based on a periodicity in the time-domain envelope signal.

10. The method of claim 9, wherein said periodicity is based on a correlation between the time-domain envelope signal and a time-shifted representation of the said time-domain envelope signal.

11. The method of claim 10, wherein said time-domain envelope signal is time-shifted by a time corresponding to the fundamental period of the associated speech frame.

12. A method of filtering a speech signal with a voice coder, the method comprising:
recording a speech signal from a user with a microphone;
parsing the speech signal into a plurality of speech frames;
determining a fundamental period of each of the plurality of speech frames;
for each of the plurality of speech frames:
  a) generating a spectra for the speech frame;
  b) parsing the spectra of the speech frame into a plurality of sub-bands,
  c) transforming each of the plurality of sub-bands into a time-domain envelope signal; and
  d) generating a plurality of sub-band voicing factors, wherein each sub-band voicing factor indicates a harmonicity of one of the plurality of sub-bands, and each sub-band voicing factor is based on a periodicity of said time-domain envelope signals associated with one of the plurality of sub-bands;
generating a plurality of recomposed frames, each recomposed frame being based on:
  a) the spectra for one of said plurality of speech frames; and
  b) the plurality of sub-band voicing factors associated with the plurality of sub-bands for one of said plurality of speech frames; and
generating a recomposed speech signal from the plurality of recomposed frames.

* * * * *